(12) United States Patent
Sano et al.

(10) Patent No.: US 11,132,611 B2
(45) Date of Patent: Sep. 28, 2021

(54) INFORMATION PROCESSING APPARATUS AND INFORMATION PROCESSING METHOD FOR DETERMINING PRESENCE PROBABILITY OF OBJECT

(71) Applicant: KABUSHIKI KAISHA TOSHIBA, Tokyo (JP)

(72) Inventors: Yuma Sano, Kanagawa (JP); Manabu Nishiyama, Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 449 days.

(21) Appl. No.: 15/453,189

(22) Filed: Mar. 8, 2017

(65) Prior Publication Data
US 2017/0344888 A1   Nov. 30, 2017

(30) Foreign Application Priority Data

May 27, 2016   (JP) .............................. JP2016-106506

(51) Int. Cl.
| | | |
|---|---|---|
| *G06K 9/00* | (2006.01) | |
| *G06N 5/04* | (2006.01) | |
| G06F 16/583 | (2019.01) | |
| *G05D 1/02* | (2020.01) | |
| *G06N 7/00* | (2006.01) | |
| *B60W 30/16* | (2020.01) | |

(52) U.S. Cl.
CPC .............. *G06N 5/04* (2013.01); *B60W 30/16* (2013.01); *G05D 1/024* (2013.01); *G05D 1/0246* (2013.01);
(Continued)

(58) Field of Classification Search
CPC ........... G06K 9/00624; G06K 9/00664; G06K 9/00671; G06K 9/00771; G06K 9/00791;
(Continued)

(56) References Cited

U.S. PATENT DOCUMENTS 5,488,674 A    1/1996 Burt et al.
7,054,467 B1 *  5/2006 Honda ................... G01S 3/784
                                                382/104
(Continued)

FOREIGN PATENT DOCUMENTS

JP          3931879       6/2007
JP       2007-310741     11/2007
(Continued)

OTHER PUBLICATIONS

Alberto Elfes, "Using Occupancy Grids for Mobile Robot Perception and Navigation", IEEE, Computer vol. 22, Issue 6, Jun. 1989, pp. 46-57 (Year: 1989).*

(Continued)

*Primary Examiner* — Eric Rush
(74) *Attorney, Agent, or Firm* — Nixon & Vanderhye, P.C.

(57) ABSTRACT

An information processing apparatus according to one embodiment includes a memory having computer executable components stored therein; and processing circuitry communicatively coupled to the memory. The processing circuitry is configured to: acquire, for each of a plurality of sensors installed in a vehicle, positional information of an object present around the vehicle measured by the sensor; calculate a probability that the object is present for each of a plurality of areas obtained by dividing surroundings of the vehicle based on the positional information measured by the sensors; record non-measurement information indicating that the positional information was not obtained for an area corresponding to a direction in which the positional information was not obtained for each of the sensors; and determine a final probability that the object is present based on the probability calculated for each of the sensors and the non-measurement information.

7 Claims, 13 Drawing Sheets

(52) U.S. Cl.
CPC ......... *G05D 1/0257* (2013.01); *G05D 1/0274* (2013.01); *G06F 16/583* (2019.01); *G06K 9/00791* (2013.01); *G06K 9/00805* (2013.01); *G06N 7/005* (2013.01); *B60R 2300/301* (2013.01); *B60W 2420/42* (2013.01); *B60W 2420/52* (2013.01); *B60W 2554/00* (2020.02); *G05D 2201/0213* (2013.01); *G06T 2207/30252* (2013.01); *G06T 2207/30261* (2013.01)

(58) Field of Classification Search
CPC ........... G06K 9/00798; G06K 9/00805; G06K 9/00812; G06K 9/03; G06K 9/34; G06K 9/62; G06K 9/6201; G06K 9/6202; G06K 9/6212; G06K 9/6215; G06K 9/6288; G06K 9/6289; G06K 9/629; G06K 9/6292; G06K 9/6293; G06K 2009/6213; G06T 7/10; G06T 7/11; G06T 7/143; G06T 7/70; G06T 7/73; G06T 2207/20021; G06T 2207/20112; G06T 2207/30236; G06T 2207/30248; G06T 2207/30252; G06T 2207/30256; G06T 2207/30261; G06T 2207/30264; G05D 1/0088; G05D 1/021; G05D 1/0212; G05D 1/0214; G05D 1/0219; G05D 1/0231; G05D 1/024; G05D 1/0246; G05D 1/0248; G05D 1/0251; G05D 1/0253; G05D 1/0255; G05D 1/0257; G05D 1/0259; G05D 1/0268; G05D 1/027; G05D 1/0274; G05D 1/0278; G05D 2201/0213; G06N 5/04; G06N 7/005; G06F 16/583; B60R 1/00; B60R 2300/30; B60R 2300/301; B60R 2300/302; B60R 2300/307; B60R 2300/802; B60K 35/00; B60W 30/06; B60W 30/08; B60W 30/085; B60W 30/09; B60W 30/095; B60W 30/10; B60W 30/12; B60W 30/16; B60W 2420/42; B60W 2420/52; B60W 2550/10; B60W 2710/18; B60W 2710/207; B60W 2720/106
USPC ....... 382/100, 103, 104, 173, 180, 181, 224, 382/282, 291, 325; 340/933, 937; 348/113, 118, 135, 143, 148
See application file for complete search history.

(56) References Cited

U.S. PATENT DOCUMENTS

| | | | | |
|---|---|---|---|---|
| 8,744,744 B2* | 6/2014 | Takagi | | B60W 40/06 |
| | | | | 701/301 |
| 9,429,650 B2* | 8/2016 | Zeng | | G06K 9/00805 |
| 9,911,191 B2* | 3/2018 | Ikoma | | G06K 9/00771 |
| 10,161,754 B2* | 12/2018 | Matsushita | | G08G 1/166 |
| 2002/0120391 A1 | 8/2002 | Nehls, III | | |
| 2005/0125154 A1* | 6/2005 | Kawasaki | | G01D 1/16 |
| | | | | 701/301 |
| 2006/0125680 A1* | 6/2006 | Thackray | | G01S 7/41 |
| | | | | 342/54 |
| 2007/0005306 A1* | 1/2007 | Foessel | | G01S 13/723 |
| | | | | 702/189 |
| 2007/0080850 A1* | 4/2007 | Abe | | G01S 13/931 |
| | | | | 342/52 |
| 2007/0198222 A1 | 8/2007 | Schuster et al. | | |
| 2007/0286475 A1 | 12/2007 | Sekiguchi | | |
| 2009/0012667 A1 | 1/2009 | Matsumoto et al. | | |
| 2011/0178668 A1* | 7/2011 | Tanaka | | G05D 1/0246 |
| | | | | 701/25 |
| 2012/0053755 A1 | 3/2012 | Takagi | | |
| 2013/0223686 A1* | 8/2013 | Shimizu | | G06K 9/00624 |
| | | | | 382/103 |
| 2013/0265424 A1* | 10/2013 | Zhang | | G06K 9/00798 |
| | | | | 348/148 |
| 2014/0025331 A1* | 1/2014 | Ma | | G01S 5/0252 |
| | | | | 702/141 |
| 2015/0109164 A1 | 4/2015 | Takaki | | |
| 2015/0154328 A1 | 6/2015 | Michalke et al. | | |
| 2015/0344028 A1* | 12/2015 | Gieseke | | B60W 30/00 |
| | | | | 701/1 |
| 2016/0117841 A1* | 4/2016 | Fukuman | | G06K 9/685 |
| | | | | 382/103 |
| 2017/0116487 A1 | 4/2017 | Yamazaki et al. | | |
| 2017/0256071 A1 | 9/2017 | Laugier et al. | | |
| 2017/0269201 A1* | 9/2017 | Adachi | | G01S 13/56 |

FOREIGN PATENT DOCUMENTS

| | | |
|---|---|---|
| JP | 2009-031884 | 2/2009 |
| JP | 2010-176669 | 8/2010 |
| JP | 5206752 | 6/2013 |
| JP | 5678793 | 3/2015 |
| JP | 2015-078926 | 4/2015 |
| JP | 5712900 | 5/2015 |
| JP | 2017-083919 | 5/2017 |
| WO | WO 2012/033173 | 3/2012 |

OTHER PUBLICATIONS

Long et al., "Fully convolutional networks for semantic segmentation", CVPR 2015.
Badrinarayanan et al., "SegNet: A Deep Convolutional Encoder-Decoder Architecture for Robust Semantic Pixel-Wise Labelling", CVPR May 27, 2015.
Sano et al., U.S. Appl. No. 15/622,824, filed Jun. 4, 2017.
Office Action dated Apr. 2, 2020 in U.S. Appl. No. 15/622,824.
Office Action dated Dec. 31, 2020 in U.S. Appl. No. 15/622,824.

* cited by examiner

INFORMATION PROCESSING APPARATUS AND INFORMATION PROCESSING METHOD FOR DETERMINING PRESENCE PROBABILITY OF OBJECT

CROSS-REFERENCE TO RELATED APPLICATIONS

This application is based upon and claims the benefit of priority from Japanese Patent Application No. 2016-106506, filed on May 27, 2016; the entire contents of which are incorporated herein by reference.

FIELD

Embodiments described herein relate generally to an information processing apparatus and an information processing method.

BACKGROUND

When an obstacle map indicating obstacles (objects) present around a subject vehicle is generated based on positional information acquired using a distance sensor such as a laser sensor, even for an area for which the positional information was not able to be acquired, an obstacle presence probability is required to be calculated.

A technology is known that when an area in which an obstacle was present in the past becomes a blind spot, the obstacle presence probability of that area is reduced and when a position that was travelable in the past becomes a blind spot, for example, the obstacle presence probability of that area is increased. Another technology is known that calculates the presence probability of a surrounding object and its reliability from the measurement result of a laser sensor and sets the reliability of a direction in which no surrounding object has been able to be detected to be lower than the reliability of a direction in which any surrounding object has been able to be detected, for example.

However, the conventional technologies have a problem in that the reliability of the obstacle presence probability is insufficient.

DETAILED DESCRIPTION

An information processing apparatus according to one embodiment includes a memory having computer executable components stored therein; and processing circuitry communicatively coupled to the memory. The processing circuitry is configured to: acquire, for each of a plurality of sensors having different characteristics and installed in a vehicle, positional information of an object present around the vehicle measured by the sensor; calculate a probability that the object is present for each of a plurality of areas obtained by dividing surroundings of the vehicle based on, for each of the sensors, the positional information measured by the sensor; record non-measurement information indicating that the positional information was not obtained for an area corresponding to a direction in which the positional information was not obtained for each of the sensors; and determine a final probability of the probability that the object is present based on the probability calculated for each of the sensors and the non-measurement information recorded for each of the sensors.

The following describes embodiments of an information processing apparatus and an information processing method in detail with reference to the accompanying drawings.

First Embodiment

Figure 1:
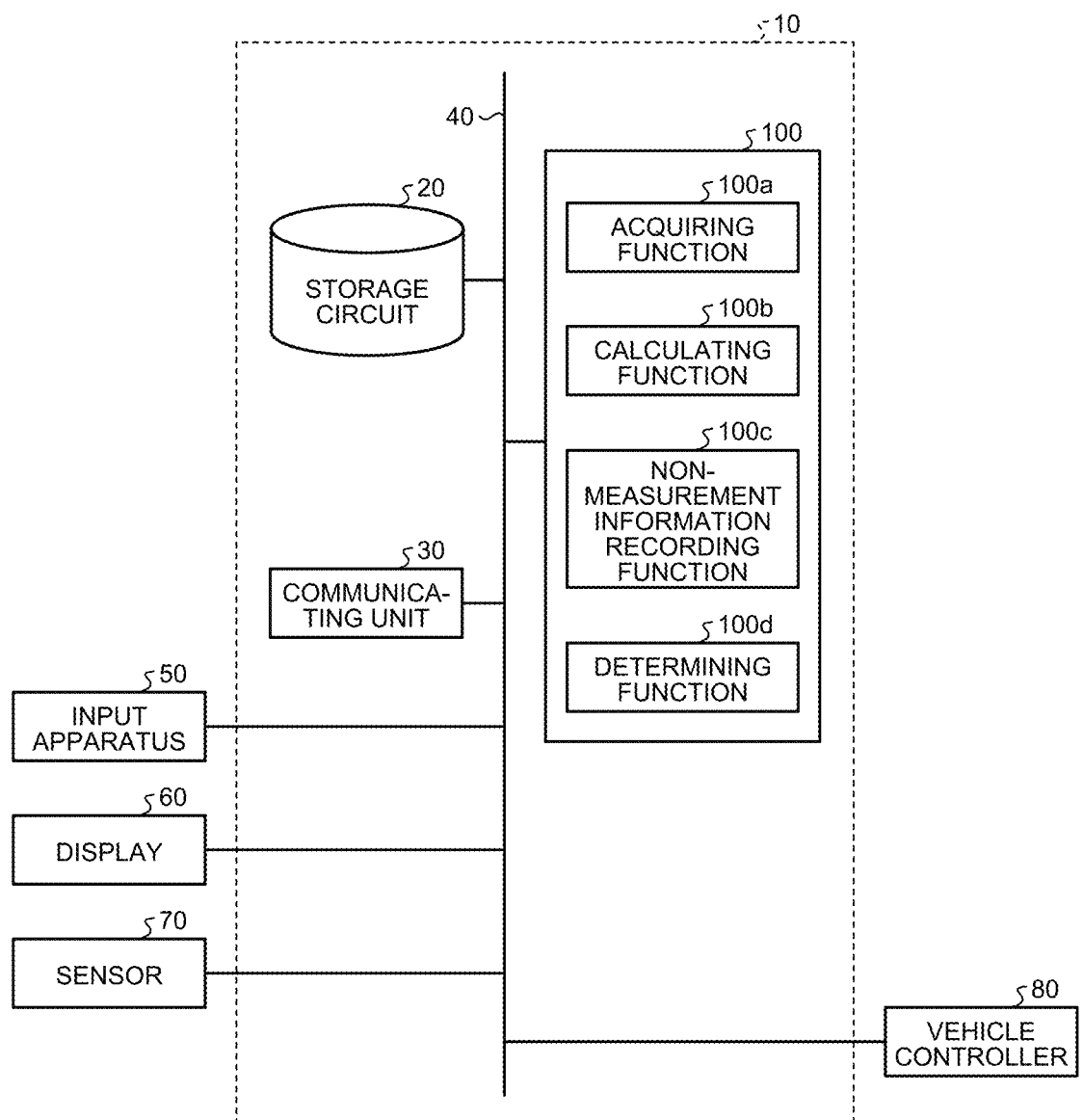
FIG. 1 is a diagram illustrating a configuration of an information processing apparatus of a first embodiment.

FIG. 1 is a diagram illustrating an example of a configuration of an information processing apparatus 10 of the present embodiment. The information processing apparatus 10 is an exclusive or general-purpose computer, for example, and is installed in a vehicle. The vehicle that installs this information processing apparatus 10 may be a normal vehicle that travels via manual driving operation, for example, or an automatic driving vehicle that can automatically travel without manual driving operation (that can autonomously travel). The present embodiment describes a case in which the vehicle that installs the information processing apparatus 10 is an automatic driving vehicle as an example.

As illustrated in FIG. 1, the information processing apparatus 10 includes a processing circuit 100, a storage circuit 20, a communicating unit 30, and a bus 40 that connect the units to each other.

The processing circuit 100 includes an acquiring function 100a, a calculating function 100b, a non-measurement information recording function 100c, and a determining function 100d. Specific details of these processing functions will be described below. Although the example in FIG. 1 mainly exemplifies functions related to the present embodiment, the functions of the processing circuit 100 are not limited to these functions.

The respective processing functions performed by the information processing apparatus 10 are stored in the storage circuit 20 in the form of a computer-executable program. The processing circuit 100 is a processor that reads the computer programs from the storage circuit 20 and executes the computer programs to implement functions corresponding to the respective computer programs. The processing circuit 100 that has read the respective computer programs has the respective functions illustrated within the processing circuit 100 in FIG. 1.

Although FIG. 1 illustrates that the single processing circuit 100 implements the processing functions performed by the acquiring function 100a, the calculating function 100b, the non-measurement information recording function 100c, and the determining function 100d, a plurality of independent processors may be combined to form the processing circuit 100, and the respective processors may execute computer programs to implement the functions. With the respective processing functions formed as computer programs, one processing circuit may execute the respective computer programs, or a specific function may be included in a dedicated, independent program execution circuit.

The acquiring function 100a included in the processing circuit 100 is an example of an "acquiring unit", the calculating function 100b is an example of a "calculating unit", the non-measurement information recording function 100c is an example of an "non-measurement information recording unit", and the determining function 100d is an example of a "determining unit".

The wording "processor" referred to in the above description means circuits of a central processing unit (CPU), a graphical processing unit (GPU), an application specific integrated circuit (ASIC), or a programmable logic device (a simple programmable logic device (SPLD), a complex programmable logic device (CPLD), and a field programmable gate array (FPGA), for example), for example. The processor implements the functions by reading and executing the computer programs stored in the storage circuit 20. In place of storing the computer programs in the storage circuit 20, the computer programs may be directly incorporated into the circuit of the processor. In this case, the processor reads and executes the computer programs incorporated into the circuit to implement the functions.

The storage circuit 20 stores therein data and the like along with the respective processing functions performed by the processing circuit 100 as needed. The storage circuit 20 of the present embodiment stores therein computer programs and data for use in various kinds of processing. The storage circuit 20 is a semiconductor memory such as a random access memory (RAM) or a flash memory, a hard disk, or an optical disc, for example. The storage circuit 20 may be replaced with a storage device outside the information processing apparatus 10. The storage circuit 20 may be a storage medium in which computer programs transmitted by a local area network (LAN), the Internet, or the like are downloaded and stored or temporarily stored. Not limited to one storage medium, a case in which the processing in the embodiment is executed from a plurality of media are included in the storage medium in the embodiment; the configuration of the medium may be either of them.

The communicating unit 30 is an interface that inputs and outputs information to and from an external apparatus connected in a wired or wireless manner. The communicating unit 30 may be connected to a network to perform communication.

An input apparatus 50 receives various kinds of instructions and information input from an operator (a driver in this case). The input apparatus 50 is a pointing device such as a mouse or a trackball or an input device such as a keyboard, for example.

A display 60 displays various kinds of information on the vehicle. The display 60 is a display device such as a liquid crystal display device, for example.

A sensor 70 is an external recognition sensor for achieving automatic driving. Examples of the sensor 70 include, but are not limited to, sonars that detect objects through sound waves, stereo cameras for acquiring information in the depth direction around a vehicle, position determining cameras for accurately determining a place in which a vehicle is traveling from a surrounding situation, millimeter wave radars and laser sensors for measuring the distance to an object present around a vehicle, and position sensors that acquire the position of a vehicle. In the present embodiment, a plurality of sensors 70 having different characteristics are installed, in which at least a Lidar sensor (may be referred to as a "first sensor" in the following description) for detecting the positional information (a distance and an angle from the subject vehicle) of an object present around the subject vehicle and a millimeter wave radar sensor (may be referred to as a "second sensor" in the following description) are installed. The following refers to the sensors simply as the sensor 70 when the first sensor and the second sensor are not discriminated from each other.

In order to drive the vehicle automatically, a vehicle controller 80 determines a surrounding situation based on the information obtained from the sensor 70 and an obstacle map obtained by processing described below to control an accelerator amount, a brake amount, a steering angle, and the like. Specifically, control of the vehicle is performed so as to keep a lane in which the vehicle is currently traveling while avoiding obstacles and to keep the distance from the car in front at a certain distance or more.

The input apparatus 50, the display 60, the sensor 70, and the vehicle controller 80 of the present embodiment are connected to the information processing apparatus 10 in a wired or wireless manner.

The following describes the respective functions of the processing circuit 100. The acquiring function 100a, for each of the sensors 70 having different characteristics and installed in the vehicle, acquires the positional information of an object present around the vehicle measured by the sensor 70. In the present embodiment, the acquiring function 100a acquires positional information measured by the Lidar sensor (the first sensor) (may be referred to as "first positional information" in the following description) and positional information measured by the millimeter wave radar sensor (the second sensor) (may be referred to as "second positional information" in the following description).

The acquiring function 100a acquires the first positional information from the first sensor and acquires the second positional information from the second sensor as described above. In this example, the storage circuit 20 stores therein area information that can identify a plurality of areas obtained by dividing the surroundings of the vehicle (the subject vehicle) in advance, and the acquiring function 100a can acquire the area information from the storage circuit 20. The area information is not limited to this, but it may be a form stored in an external storage device, for example. Furthermore, the acquiring function 100a acquires self-position-and-attitude information indicating that the position and the attitude of the subject vehicle using the Global Positioning System (GPS), for example. The acquiring function 100a transmits information (may be referred to as "object position-related information" in the following description) containing the first positional information, the second positional information, the area information, and the self-position-and-attitude information acquired as described above to the calculating function 100b and the non-measurement information recording function 100c.

The present embodiment assumes that, as the positional information of the object present around the subject vehicle, the coordinate information of a point corresponding to the object in a coordinate system with the position of the subject vehicle at the origin is acquired. As described above, the present embodiment acquires two kinds of positional information (the first positional information and the second positional information) by the Lidar sensor (the first sensor) and the millimeter wave radar sensor (the second sensor). The millimeter wave radar sensor radiates a radio wave in the millimeter waveband to the surroundings of the subject vehicle and compares a reflected wave from the object with the radiated wave to measure the distance from the subject vehicle to the object. The Lidar sensor emits laser light shorter in wavelength than a millimeter wave from the sensor and measures the distance from the sensor to the object through the phase difference between a reflected wave from the object and the emitted light. The millimeter wave radar sensor is characterized by having capability of measuring farther distance information than the Lidar sensor and by having difficulty in measuring the distance of an object that easily absorbs radio waves such as a pedestrian. The distance sensor is not limited to the Lidar sensor and the millimeter wave radar sensor; the positional information of the object present around the subject vehicle can be measured by means such as a three-dimensional reconstruction technology using an ultrasonic sensor, a stereo camera, or a monocular camera.

As to the self-position-and-attitude information, coordinate information indicating the position of the subject vehicle is acquired using the GPS installed in the vehicle, and the attitude information of the subject vehicle can be acquired using an inertial measurement unit (IMU) similarly installed in the vehicle. The coordinate information indicating the position of the subject vehicle is assumed to be world coordinates with a certain position as a standard.

Figure 2:
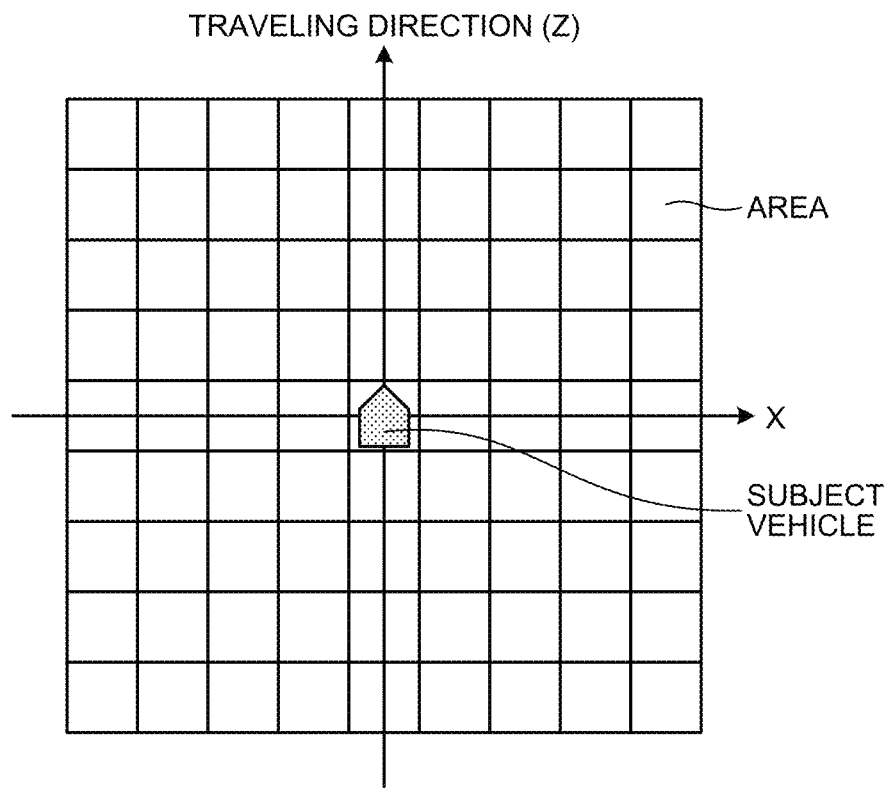
FIG. 2 is a diagram illustrating an area around a subject vehicle of the first embodiment.

The following describes the division of the surroundings of the subject vehicle. FIG. 2 is a diagram illustrating an example of a plurality of areas obtained by dividing the surroundings of the subject vehicle in a lattice manner (an example of a plurality of areas identified by the area information). Although the surroundings of the subject vehicle are divided in a lattice manner in the example in FIG. 2, the divided shape may be any shape and is not limited to the lattice shape. The example in FIG. 2 sets the traveling direction of the subject vehicle to be a z axis, the height direction to be a y axis, and an axis orthogonal to the y axis and the z axis to be an x axis. As illustrated in FIG. 2, a space with a certain range with the position of the subject vehicle at the center (a space around the subject vehicle) is divided into a plurality of lattice-shaped areas on the xz plane. The area information is information indicating the sizes and the positions of the respective areas obtained by this division. The coordinates of the point corresponding to the object present around the subject vehicle are represented by a coordinate in the x direction (an x coordinate) and a coordinate in the z direction (a z coordinate) in FIG. 2.

As described above, the acquiring function 100a acquires the first positional information measured by the Lidar sensor (the first sensor), the second positional information measured by the millimeter wave radar sensor (the second sensor), the self-position-and-attitude information, and the area information and sends the object position-related information containing the acquired pieces of information to the calculating function 100b and the non-measurement information recording function 100c.

The calculating function 100b calculates a probability that an object is present (may be referred to as an "obstacle presence probability" in the following description) for each of the areas obtained by dividing the surroundings of the vehicle based on, for each of the sensors 70 (for each of the first sensor and the second sensor in this example), the positional information measured by the sensor 70 (the first positional information or the second positional information in this example). Although the probability that the object is present may be considered as the same meaning as a probability that the subject vehicle can travel, when the probability that the object is present is higher, the probability that the subject vehicle can travel is lower. In this example, the calculating function 100b calculates the obstacle presence probability of each of the areas obtained by dividing the surroundings of the vehicle for each of the first sensor and the second sensor using the object position-related information received from the acquiring function 100a.

Figure 3:
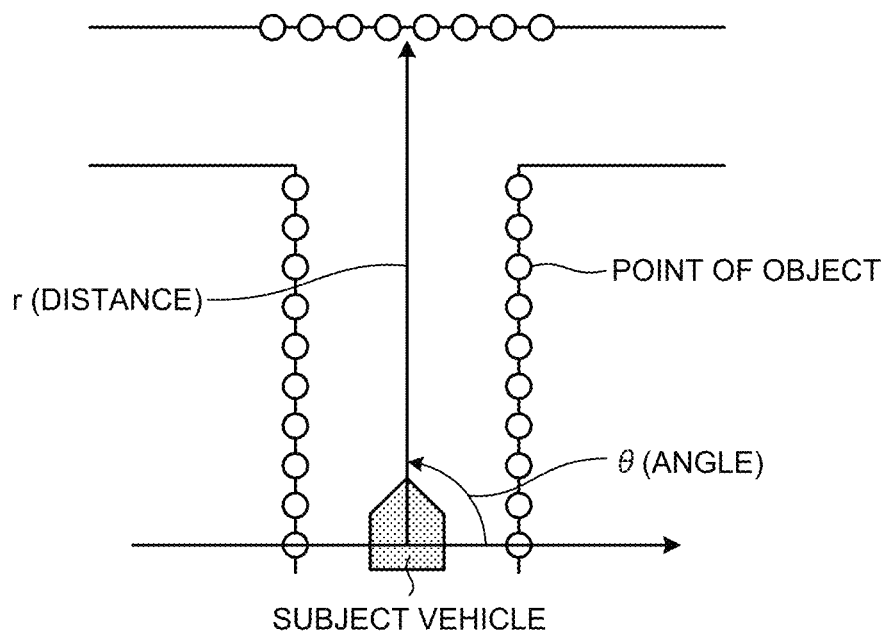
FIG. 3 is a diagram illustrating a method for calculating an obstacle presence probability of the first embodiment.

In the present embodiment, the calculating function 100b calculates the obstacle presence probability of each of the areas obtained by dividing the surroundings of the subject vehicle in the range of 0.0 to 1.0 based on ray casting. The obstacle presence probability is not limited to a continuous value and may be represented by a binary value (a value indicating that the object is present or a value indicating that the object is not present), for example. The following gives a detailed description with reference to FIG. 3 to FIG. 6. FIG. 3 illustrates points of objects (objects present around the subject vehicle) measured in a scene in which the subject vehicle has approached a T-junction surrounded by walls. First, when the positional information of the points of the objects present around the subject vehicle has been acquired in the Cartesian coordinate system, transformation is performed from Cartesian coordinates (x,z) into polar coordinates (r,θ) as indicated by the following Equation (1). When the positional information of the points has been acquired in polar coordinates, the following coordinate transformation is unnecessary.

$$r = \sqrt{x^2 + z^2}$$

$$\theta = a\,\tan(z/x) \qquad (1)$$

Figure 4:
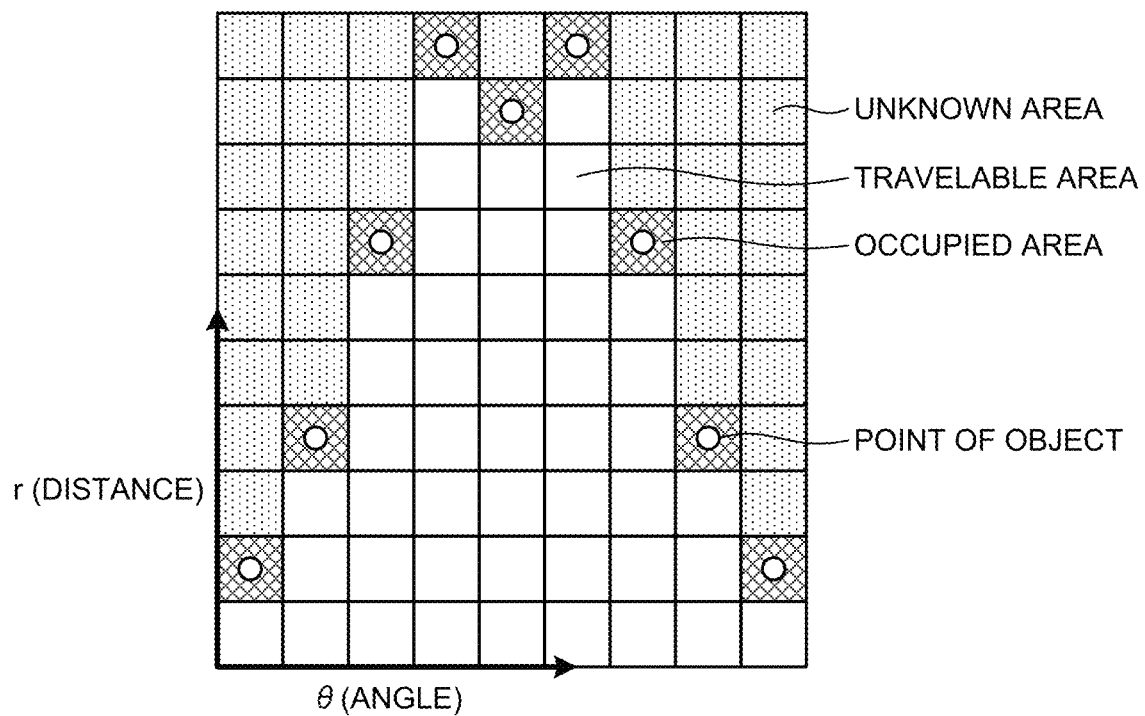
FIG. 4 is a diagram illustrating the method for calculating an obstacle presence probability of the first embodiment.

FIG. 4 illustrates how the space around the subject vehicle is divided into a plurality of areas in polar coordinates and how the presence of the objects (obstacles) is set for the scene in FIG. 3. In FIG. 4, the lateral direction (the right-and-left direction) indicates an angular direction from the subject vehicle, whereas the vertical direction (the up-and-down direction) indicates a distance from the subject vehicle. FIG. 4 is an example when the space in front of the subject vehicle is divided (divided into nine) in the angular direction by 20 degrees. Next, the calculating function 100b detects a point of an object present at a position closest to the subject vehicle for each of the nine angular directions and determines an area containing the point. In this example, for the area containing the point of the object present at the position closest to the subject vehicle for each of the angular directions, the obstacle presence probability is set to a maximum value (1.0). This means that an obstacle is present at the area, and the area is called an "occupied area". For the areas closer to the subject vehicle than the area containing the point present at the position closest to the subject vehicle in each of the angular directions, the obstacle presence probability is set to a minimum value (0.0). This means that no obstacle is present in the areas, and the areas are called "travelable areas". Furthermore, for the areas farther from the subject vehicle than the area containing the point present at the position closest to the subject vehicle in each of the angular directions, the obstacle presence probability is set to an intermediate value (0.5). This means that the state of the areas farther than the object viewed from the subject vehicle is shielded by the object, cannot be recognized, and is unknown, and the areas are called "unknown areas".

Figure 5:
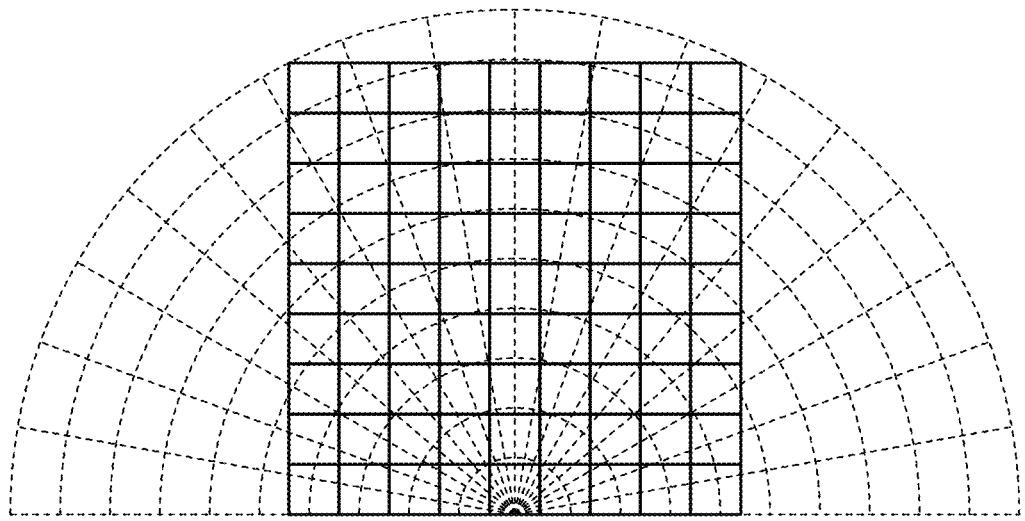
FIG. 5 is a diagram illustrating the method for calculating an obstacle presence probability of the first embodiment.
Figure 6:
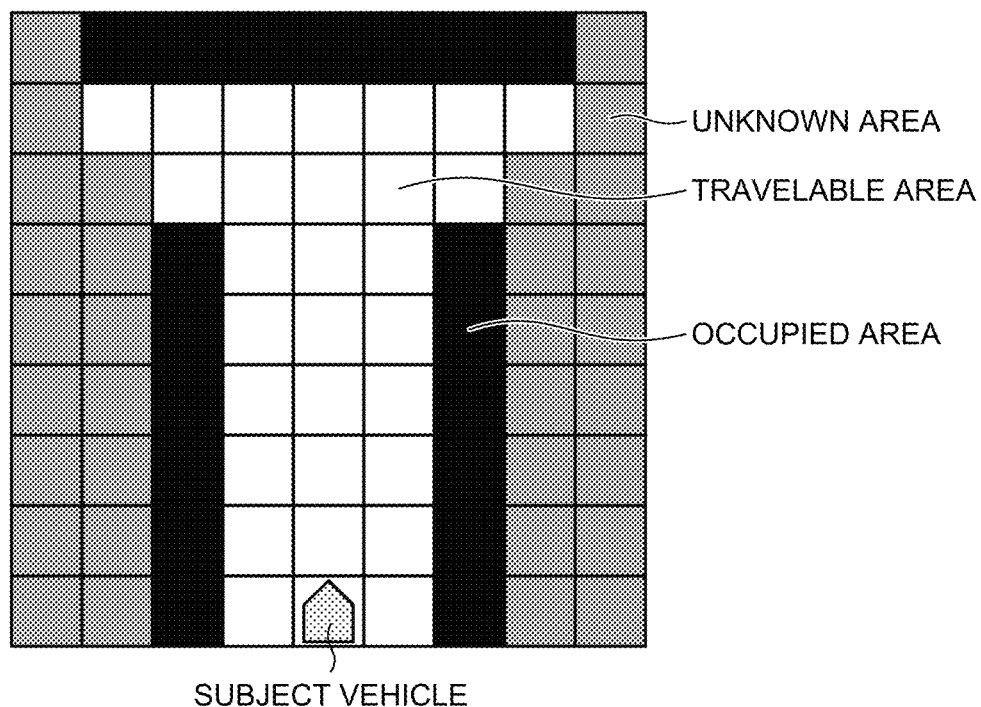
FIG. 6 is a diagram illustrating the method for calculating an obstacle presence probability of the first embodiment.

Next, the calculating function 100b transforms the obstacle presence probabilities of the respective areas generated in the polar coordinate system into the Cartesian coordinate system. FIG. 5 is a diagram illustrating a relation between rectangular areas in the polar coordinate system and rectangular areas in the Cartesian coordinate system by the Cartesian coordinate system. The rectangular areas indicated by the straight lines in FIG. 5 are areas divided into rectangles in the Cartesian coordinate system, whereas the areas indicated by the broken lines are obtained by displaying the areas divided into the rectangles in the polar coordinate system on the Cartesian coordinate system. In the positional relation illustrated in FIG. 5, for each of the areas in the Cartesian coordinate system, the obstacle presence probability of the closest area among the rectangularly divided areas in the polar coordinate system is set as the obstacle presence probability of that area by the nearest neighbor method. Alternatively, for each of the areas in the Cartesian coordinate system, the obstacle presence probabilities of areas positioned close thereto among the areas divided into the rectangles in the polar coordinate system are interpolated using the bilinear method to be set as the obstacle presence probability of that area. These methods are examples of the coordinate transformation from the polar coordinate system into the Cartesian coordinate system and are not limited to the examples. FIG. 6 illustrates the obstacle presence probabilities of the respective areas as a result of transforming the obstacle presence probabilities of the respective areas (FIG. 4) generated in the polar coordinate system in the scene illustrated in FIG. 3 into the Cartesian coordinate system. For the scene in FIG. 3, in the Cartesian coordinate system, for the areas corresponding to the walls on the sides of the road on which the subject vehicle is traveling in a straight line, the obstacle presence probability is set to the maximum value (displayed in "black" in FIG. 6); for the areas on the farther side thereof, the obstacle presence probability is set to be the intermediate value (displayed in "grey" in FIG. 6), the state of which is unknown. For the areas present in between the areas where the obstacles are present and the subject vehicle, the obstacle presence probability is set to be the minimum value (displayed in "white" in FIG. 6).

Figure 7:
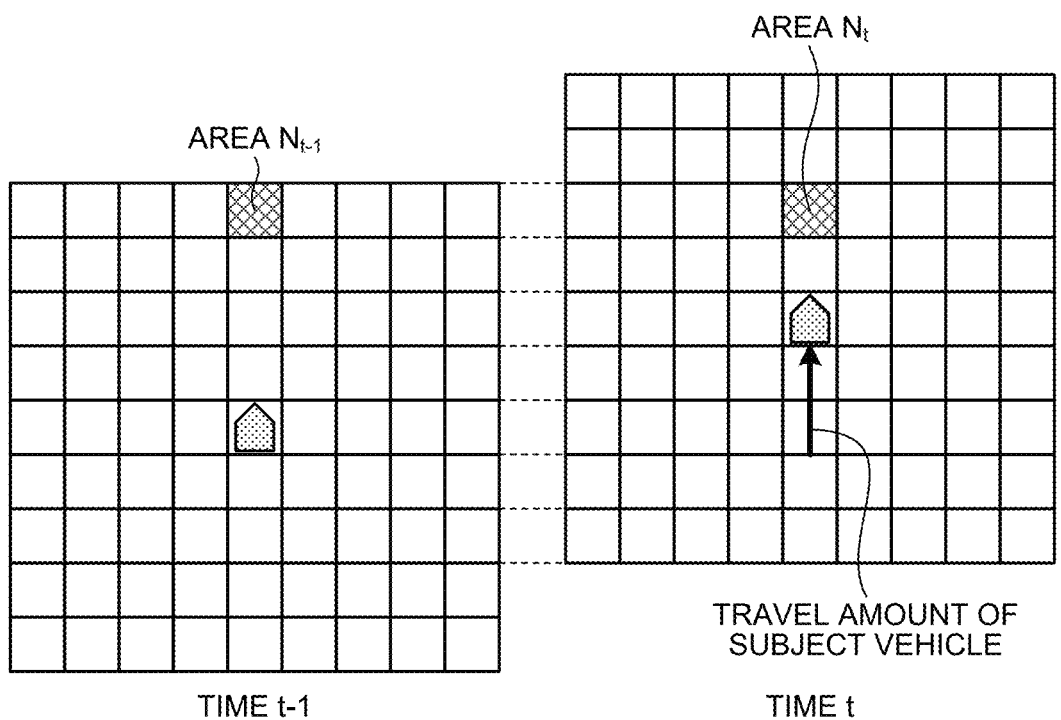
FIG. 7 is diagram illustrating time-series integration of the obstacle presence probability of the first embodiment.

The obstacle presence probabilities of the respective areas have been calculated from the current positional information, and the following integrates the obstacle presence probabilities calculated from the current positional information and past obstacle presence probabilities in a time-series manner. The following describes the time-series integration of the obstacle presence probabilities with reference to FIG. 7. FIG. 7 illustrates a plurality of areas obtained by dividing the space around the subject vehicle at the center at a time t−1 and a time t. The area $N_{t-1}$ at the time t−1 and the area $N_t$ at the time t indicate the same position in the world coordinate system, although the relative positions from the subject vehicle are different from each other between the respective times. In the time-series integration of the obstacle presence probabilities, the travel amount of the subject vehicle between the time t and the time t−1, which is the immediately preceding time, is calculated from the self-position-and-attitude information and obtains areas at the time t−1 corresponding to the respective areas at the time t based on the travel amount of the subject vehicle. In the example in FIG. 7, the area $N_{t-1}$ at the time t−1 corresponding to the area $N_t$ at the time t is obtained. The obstacle presence probabilities calculated at the area $N_t$ (the obstacle presence probabilities calculated based on the current positional information) and the past obstacle presence probabilities already calculated at the area $N_{t-1}$ are integrated. The time-series integration of the obstacle presence probabilities is performed in accordance with Bayes' theorem as indicated by the following Equation (2).

$$\frac{p(m_i \mid z_l, \dots, z_t)}{1 - p(m_i \mid z_l, \dots, z_t)} = \frac{p(m_i \mid z_t)}{1 - p(m_i \mid z_t)} \cdot \frac{p(m_i \mid z_l, \dots, z_{t-1})}{1 - p(m_i \mid z_l, \dots, z_{t-1})} \quad (2)$$

In Equation (2), p ($m_i|z_t$) represents the obstacle presence probability based on the current positional information; $p(m_i|z_1, \dots, z_{t-1})$ represents the obstacle presence probability based on the past positional information; and $p(m_i|z_1, \dots, z_t)$ represents the obstacle presence probability based on the positional information up to the current time. The obstacle presence probabilities of the respective areas are integrated in a time-series manner, whereby even when a sensor observes a value containing noise with certain timing, for example, the obstacle presence probabilities can be calculated robustly. As described above, the calculating function 100b calculates a probability that the object is present for each of the areas obtained by dividing the surroundings of the vehicle based on, for each of the sensors 70, the positional information measured by the sensor 70. As described above, the calculating function 100b calculates the obstacle presence probability of each of the areas obtained by dividing the surroundings of the vehicle based on the first positional information measured by the first sensor and calculates the obstacle presence probability of each of the areas obtained by dividing the surroundings of the vehicle based on the second positional information measured by the second sensor. The calculation results are then sent to the determining function 100d.

The following describes the non-measurement information recording function 100c. The non-measurement information recording function 100c records non-measurement information indicating that the positional information was not obtained for an area corresponding to a direction in which the positional information was not obtained for each of the sensors 70. In the present embodiment, the non-measurement information recording function 100c, for each of the first sensor (the Lidar sensor) and the second sensor (the millimeter wave sensor), every time the positional information was not obtained by each of them, records the non-measurement information for the area corresponding to the direction in which the positional information was not obtained. The non-measurement information may represent the number of times that the positional information was not obtained or represent a time when the positional information was not obtained. Although this example describes a case in which the non-measurement information recording function 100c records a time when the positional information was not obtained for the area corresponding to the direction in which the positional information was not obtained every time the positional information was not obtained as the non-measurement information as an example, this is not limited to the example; the non-measurement information recording function 100c, every time the positional information was not obtained, may record the number of times that the positional information was not obtained (an accumulated value up to the current time) for the area corresponding to the direction in which the positional information was not obtained as the non-measurement information, for example.

In the present embodiment, the non-measurement information recording function 100c, every time the positional information was not obtained by the first sensor, records a time when the positional information (the first positional information) was not obtained for the area corresponding to the direction in which the positional information was not obtained as the non-measurement information. The non-measurement information recording function 100c, every time the positional information was not obtained by the second sensor, records a time when the positional information (the second positional information) was not obtained for the area corresponding to the direction in which the positional information was not obtained as the non-measurement information. In other words, the non-measurement information recording function 100c records the non-measurement information of each area (each of the areas obtained by dividing the surroundings of the subject vehicle) for each of the first sensor and the second sensor. The following may refer to a result of recording the non-measurement information of each of the areas using the first sensor as a "first non-measurement information record" and refer to a result of recording the non-measurement information of each of the areas using the second sensor as a "second non-measurement information record".

In this example, assuming that both the first sensor and the second sensor emit (scan in a line direction) a laser of one line to measure the distance to an object and acquire the positional information of the object, the distance cannot be measured when there is no object (three-dimensional object) in the measurement range of the sensor when viewed from the subject vehicle, and the positional information of the object cannot be obtained in that direction. In this example, when the positional information was not obtained for all the areas contained in a certain angular direction among the areas obtained by dividing the surroundings of the subject vehicle, the non-measurement information recording function 100c records a time at that time (a time when the positional information was not acquired) as the non-measurement information for all the areas contained in the angular direction. The time is not necessarily required to be a form in hours, minutes, and seconds and may be a form showing information indicating whether the positional information was able to be acquired at each sensing timing and its temporal sequence (time series). The inability of acquiring the positional information includes not only a case when the reflected wave of the light emitted from the sensor 70 does not return to the sensor 70 but also a case when the reflectance is extremely low even when the reflected wave returns to the sensor 70.

Figure 8:
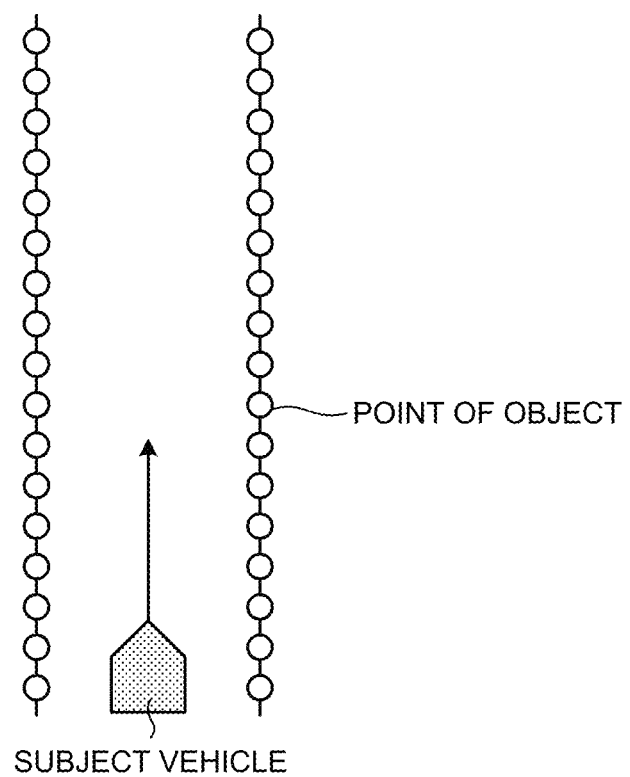
FIG. 8 is a diagram illustrating a method for recording non-measurement information of the first embodiment.
Figure 9A:
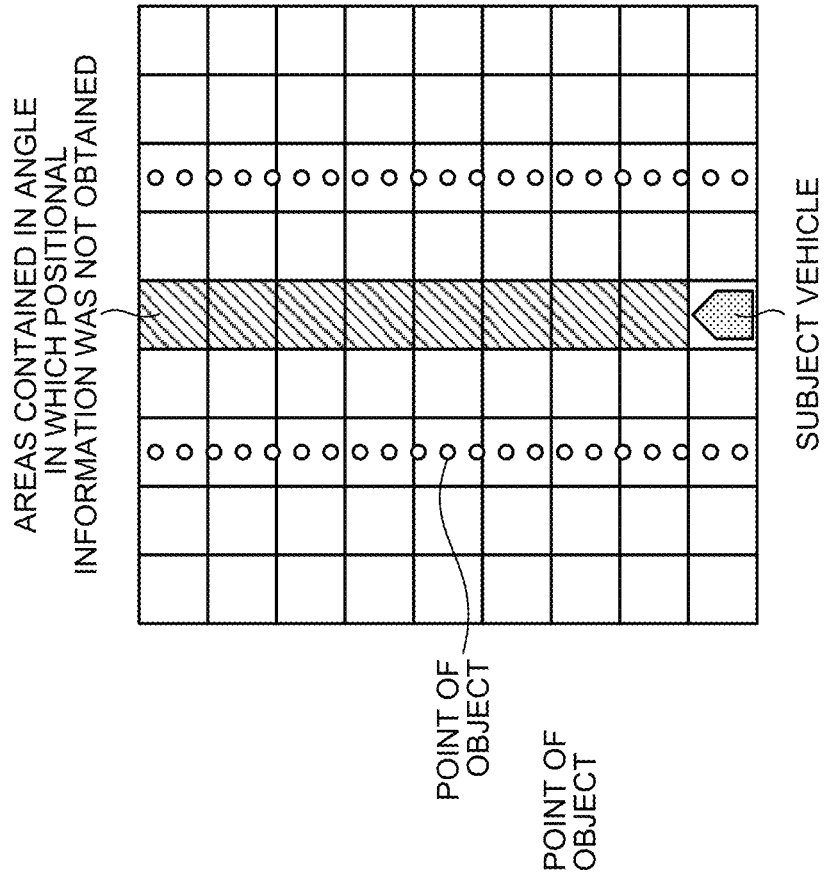
FIGS. 9A and 9B are diagrams illustrating the method for recording non-measurement information of the first embodiment.
Figure 9B:
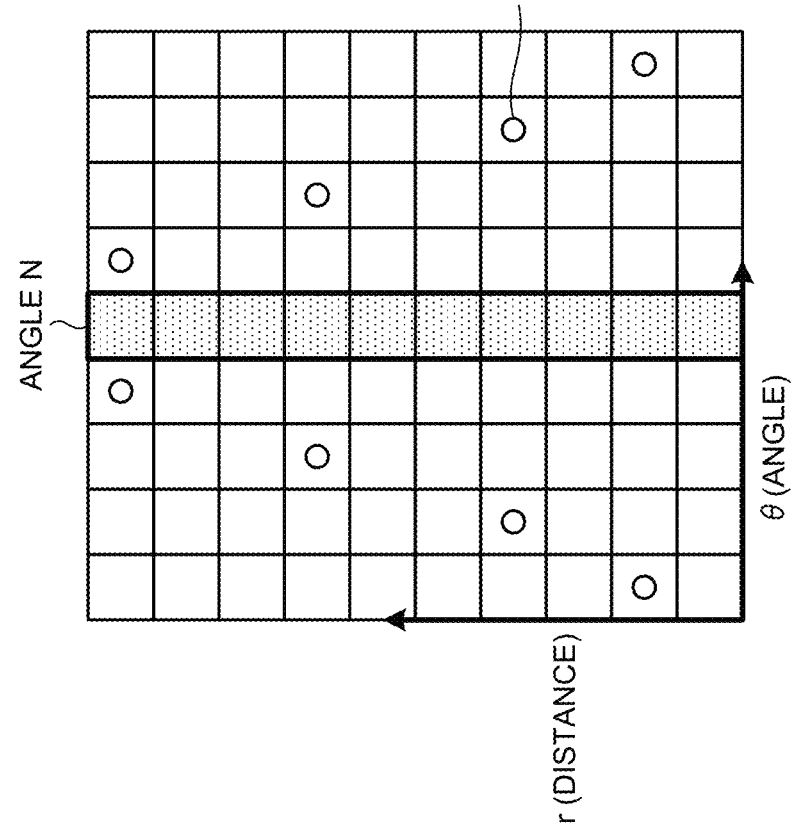

The following describes an example of the non-measurement information with reference to FIG. 8 and FIGS. 9A and 9B. FIG. 8 illustrates a scene when the subject vehicle is traveling on a straight road on which there is no obstacle ahead. For the scene in FIG. 8, FIG. 9A illustrates a relation between the respective areas divided into rectangles in the polar coordinate system and points of objects (obstacles) present around the subject vehicle. Although the points of the objects are measured for the direction from the subject vehicle toward the wall on the side of the roadway (an angle different from the angle N corresponding to the traveling direction), there is no wall in the traveling direction (the angle N), and the points of the objects cannot be measured. The positional information of the objects cannot be acquired in all the areas contained in the angle N in FIG. 9A, and the current time is recorded as the non-measurement information for all the areas contained in the angle N (the grey areas in FIG. 9A). FIG. 9B is a diagram illustrating a result of transforming the information in FIG. 9A into the Cartesian coordinate system. In FIG. 9B, the hatched areas are areas in which the non-measurement information is recorded. The time recorded as the non-measurement information is held for each of the areas and is held for a while after that. When the non-measurement information for the past 10 sensing results is held, for example, when there is any time in which the positional information was not obtained (a time of non-measurement) for the past 10 sensing results in each of the areas, information indicating the time at that time is held. As described above, the non-measurement information recording function 100c generates the results recording the non-measurement information of each of the areas (the first non-measurement information record and the second non-measurement information record) for each of the first sensor and the second sensor and sends the generated results to the determining function 100d.

The determining function 100d determines the final probability of the probability that the object is present based on the probability calculated for each of the sensors 70 and the non-measurement information recorded for each of the sensors 70. More specifically, the determining function 100d, for each of the areas obtained by dividing the surroundings of the subject vehicle, determines the final probability of the probability that the object is present in that area based on the probability calculated for each of the sensors 70 and the non-measurement information recorded for each of the sensors 70. The determining function 100d can determine a probability calculated based on the positional information of the sensor the number of times of which that the positional information was not obtained is the least to be the final probability for each of the areas, for example. In this example, the determining function 100d can determine a probability calculated based on the positional information of the sensor the number of times of which when the positional information was not obtained (corresponding to the number of times that the positional information was not obtained) is the least out of the first sensor and the second sensor to be the final probability for each of the areas.

The determining function 100d can also perform weighted summation corresponding to the non-measurement information of the probability calculated for each of the sensors for each of the areas to determine the final probability, for example. More specifically, the determining function 100d increases the weight of the probability calculated based on the positional information of the sensor 70 for the sensor 70 the number of times of which that the positional information was not obtained is less among the sensors 70 to determine the final probability. In this example, the determining function 100d can increase the weight of the probability calculated based on the positional information of the sensor 70 for the sensor 70 the number of times of which when the positional information was not obtained is less out of the first sensor and the second sensor to determine the final probability.

Furthermore, the determining function 100d can also reduce the weight of the probability calculated based on the positional information measured by the sensor 70 for the sensor 70 the number of times of which when the positional information was not obtained is larger and reduce the weight of the probability calculated based on the positional information measured by the sensor 70 for the sensor 70 the time of which when the positional information was not obtained is later to determine the final probability. When the number of times when the positional information measured by the first sensor (the first information) was not obtained and the number of times when the positional information measured by the second sensor (the second information) was not obtained are the same in any area, for example, a probability calculated based on the positional information of the sensor 70 the time of which when the positional information was not obtained is older out of the first sensor and the second sensor can also be determined to be the final probability.

The division of the probability and the division of the measurement of the non-measurement information are not necessarily required to match each other. In other words, the area for which the probability is calculated and the area for which the non-measurement information is recorded are not necessarily required to match each other. When the final probability is determined in the form in which the area for which the probability is calculated and the area for which the non-measurement information is recorded do not match each other, the final probability can be determined from the probability and the non-measurement information between areas in mutually corresponding positional relation, for example.

Figure 10A:
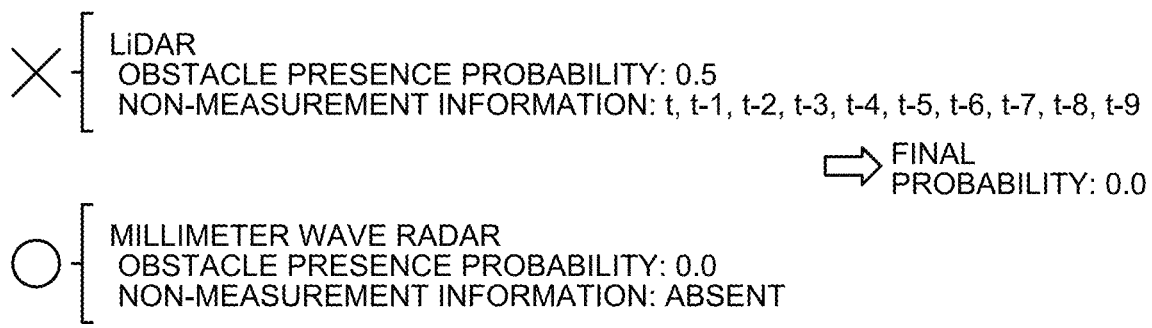
FIGS. 10A, 10B, and 10C are diagrams illustrating a method for calculating a final probability of the first embodiment.
Figure 10B:
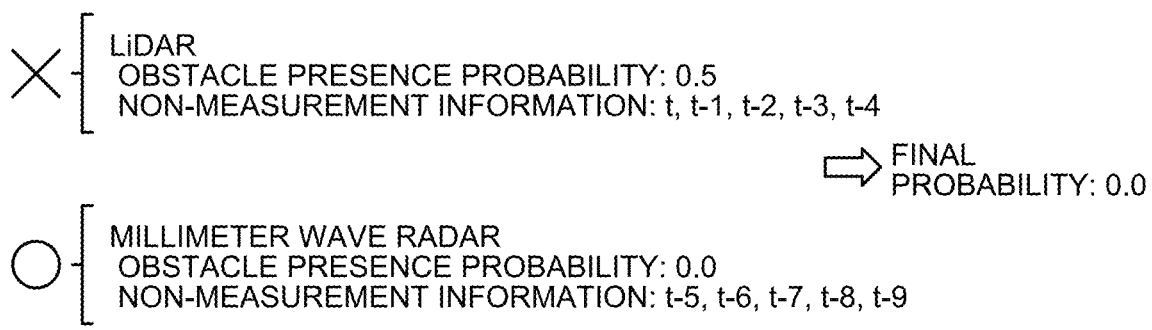
Figure 10C:
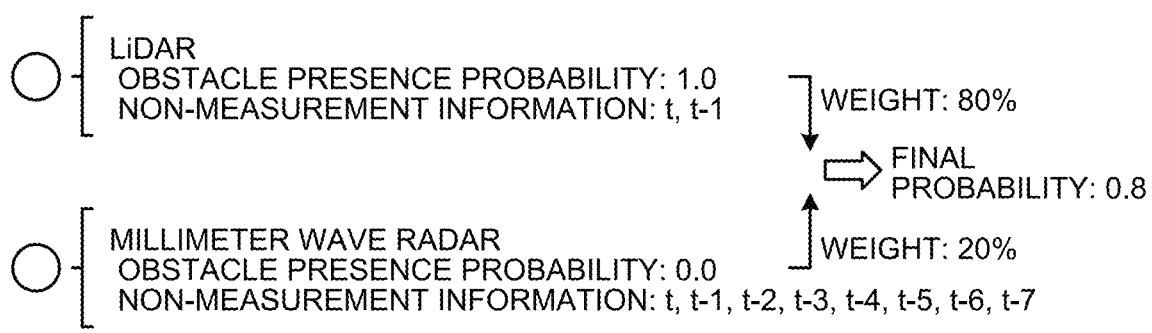

The following describes a method for calculating the final probability with reference to FIGS. 10A, 10B, and 10C. The example in FIGS. 10A, 10B, and 10C describes a case in which each of the first non-measurement information record and the second non-measurement information record records the non-measurement information (times when the positional information was not obtained in this example) in the past 10 pieces of sensing for each of the areas obtained by dividing the surroundings of the subject vehicle as an example.

In FIG. 10A, the obstacle presence probability (as a result of being integrated in a time-series manner) based on the first positional information measured by the first sensor (the Lidar sensor) is 0.5, and the number of times when the first positional information was not obtained is 10 times including t−9 to t in any area of interest among a plurality of areas. The obstacle presence probability based on the second positional information measured by the second sensor (the millimeter wave sensor) is 0.0, and the number of times when the second positional information was not obtained is 0. The example in FIG. 10A can occur in an area present in the traveling direction of the subject vehicle in a scene as in FIG. 8. In this situation, there is no object (three-dimensional object) in the measurement range of the Lidar sensor as the first sensor, and the Lidar sensor cannot measure the positional information, giving an obstacle presence probability of 0.5 representing being unknown, whereas the millimeter wave sensor as the second sensor can detect an object (a three-dimensional object) present farther than the range of FIG. 8, and a time when the positional information was not obtained does not occur, giving an obstacle presence probability of 0.0.

In the example in FIG. 10A, the determining function 100d determines the probability calculated based on the positional information of the sensor 70 the number of times when the positional information was not obtained (the number of times that the positional information was not obtained) of which is the least to be the final probability for each of the areas. This determination regards the obstacle presence probability calculated based on the positional information of the sensor 70 the number of times of which when the positional information was not obtained is larger as uncertain information and relies on the obstacle presence probability calculated based on the positional information of the sensor 70 the number of times of which when the positional information was not obtained is less (the number of times of which that the positional information was not obtained is less), which is regarded as the final probability.

As another example, in FIG. 10B, the obstacle presence probability based on the first positional information measured by the first sensor (the Lidar sensor) is 0.5, and the number of times when the first positional information was not obtained is five times including t−4 to t in an area of interest. The obstacle presence probability based on the second positional information measured by the second sensor (the millimeter wave sensor) is 0.0, and the number of times when the second positional information was not obtained is five times including t−9 to t−5. In this case, it is revealed that although the number of times when the first positional information was not obtained and the number of times when the second positional information was not obtained are the same, the millimeter wave sensor was older than the Lidar sensor in the timing when the positional information was not obtained. It can be said that the sensor 70 the timing of which when the positional information was not obtained is the latest is more uncertain than the sensor 70 the timing of which when the positional information was not obtained is older in the obstacle presence probability calculated based on the positional information of the sensor 70. Given this situation, in the example in FIG. 10B, even if the numbers of times when the positional information was not obtained (the numbers of times of non-measurement) are the same, the obstacle presence probability based on the positional information of the millimeter wave radar the time of which when the positional information was not obtained is older is determined to be the final probability.

As a still another example, in FIG. 10C, the obstacle presence probability based on the first positional information measured by the first sensor (the Lidar sensor) is 1.0, and the number of times when the first positional information was not obtained is two times including t−1 to t in an area of interest. The obstacle presence probability based on the second positional information measured by the second sensor (the millimeter wave sensor) is 0.0, and the number of times when the second positional information was not obtained is eight times including t−7 to t. In FIG. 10C, there are times when the positional information was not obtained in the respective sensors 70, and the weight of the probability calculated based on the positional information of the sensor 70 is increased for the sensor 70 the number of times of which when the positional information was not obtained is less, and the obstacle presence probability based on the first positional information and the obstacle presence probability based on the second positional information are subjected to weighted summation, whereby the final probability is determined. As described above, the determining function 100d determines the final probability for each of the areas, thereby being able to obtain an obstacle map.

Figure 11:
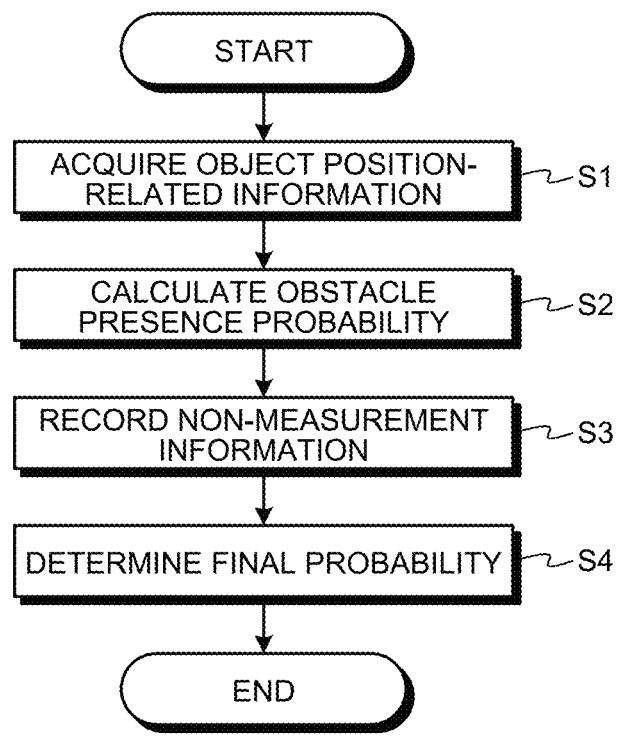
FIG. 11 is a diagram illustrating an operational example of the information processing apparatus of the first embodiment.

FIG. 11 is a flowchart illustrating an operational example of the information processing apparatus 10 (the processing circuit 100) of the present embodiment. The specific details of the respective steps are as described above, and descriptions thereof will be omitted as appropriate. As illustrated in FIG. 11, the acquiring function 100a acquires the object position-related information (Step S1). Next, the calculating function 100b calculates the obstacle presence probability for each of the areas obtained by dividing the surroundings of the subject vehicle based on, for each of the sensors 70, the positional information measured by the sensor 70 (Step S2). Next, the non-measurement information recording function 100c, for each of the sensors 70, every time the positional information was not obtained by each of them, records the non-measurement information for the area corresponding to the direction in which the positional information was not obtained (Step S3). Next, the determining function 100d determines the final probability based on the obstacle presence probability calculated for each of the sensors 70 and the non-measurement information for each of the sensors 70 (the first non-measurement information record and the second non-measurement information record) for each of the areas obtained by dividing the surroundings of the subject vehicle (Step S4).

As described above, in the present embodiment, for each of the sensors 70 having different characteristics and installed in the vehicle, based on the positional information measured by the sensor 70, the obstacle presence probability for each of the areas obtained by dividing the surroundings of the subject vehicle is calculated. For each of the sensors 70, every time the positional information of the sensor 70 was not obtained, the non-measurement information for the area corresponding to the direction in which the positional information was not obtained is recorded. For each of the areas obtained by dividing the surroundings of the subject vehicle, the final probability is determined based on the obstacle presence probability calculated for each of the sensors 70 and the non-measurement information recorded for each of the sensors 70, and the reliability of the final probability can be sufficiently increased compared with a configuration that calculates the final probability using one sensor 70 alone.

Second Embodiment

The following describes a second embodiment. For the parts common to those of the first embodiment, descriptions thereof will be omitted as appropriate.

In this example, the sensor 70 includes an imaging unit (camera) that images the surroundings of the vehicle. In this example, the imaging indicates converting an image of a subject formed by an optical system such as a lens into an electric signal.

Figure 12:
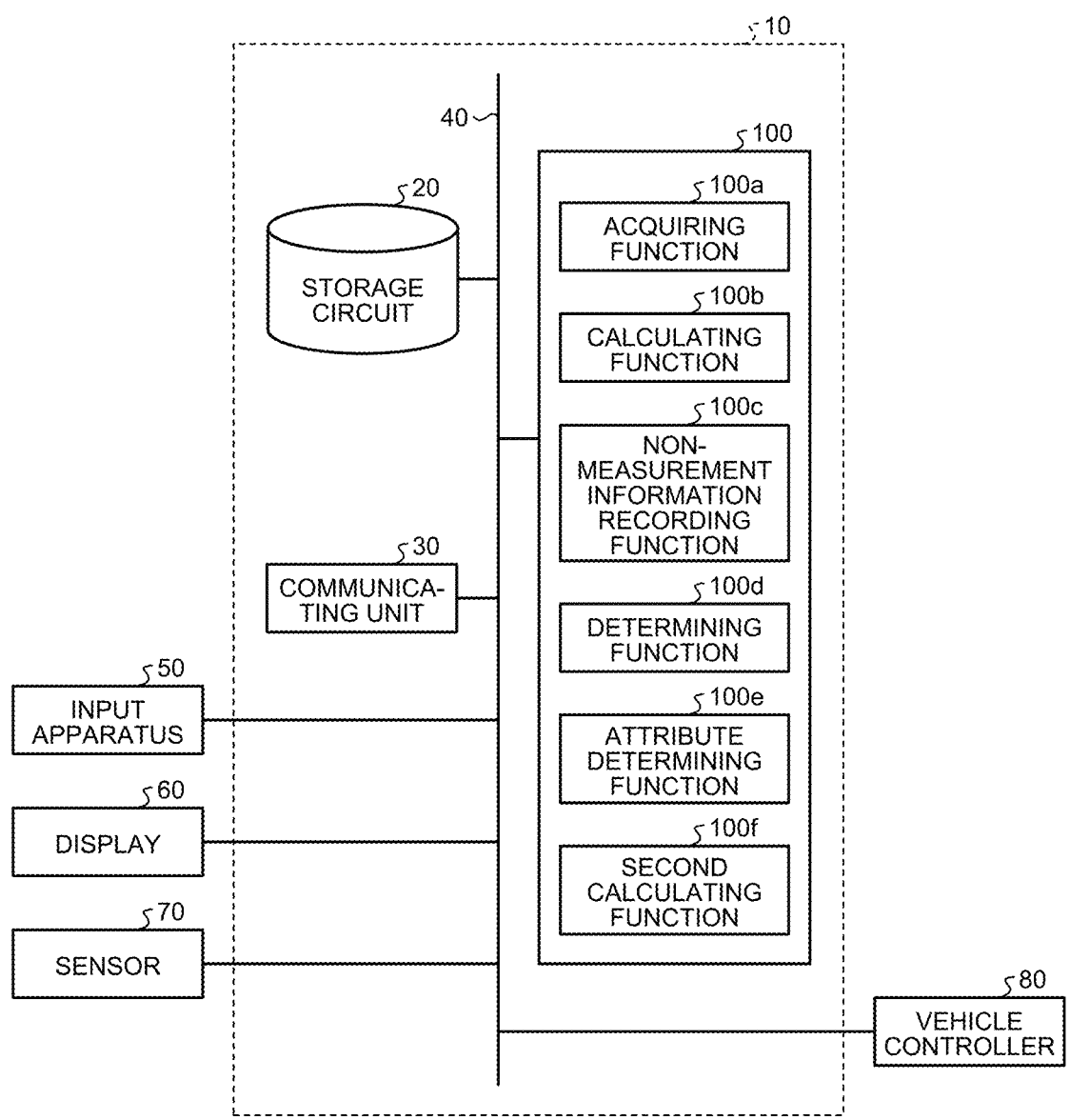
FIG. 12 is a diagram illustrating a configuration of an information processing apparatus of a second embodiment.

FIG. 12 is a diagram illustrating an example of a configuration of the information processing apparatus 10 of the present embodiment. As illustrated in FIG. 12, the processing circuit 100 is different from the first embodiment in that it further includes an attribute determining function 100e and a second calculating function 100f.

In the present embodiment, the acquiring function 100a acquires the positional information (the positional information of an object present around the subject vehicle) measured by one kind of distance sensor (the Lidar sensor or the millimeter wave sensor, for example). The non-measurement information recording function 100c records the non-measurement information corresponding to the one kind of sensor.

The attribute determining function 100e is an example of an "attribute determining unit" and determines an attribute for each of the areas obtained by dividing the surroundings of the subject vehicle based on a taken image obtained by an imaging unit that images the surroundings of the subject vehicle.

Figure 13:
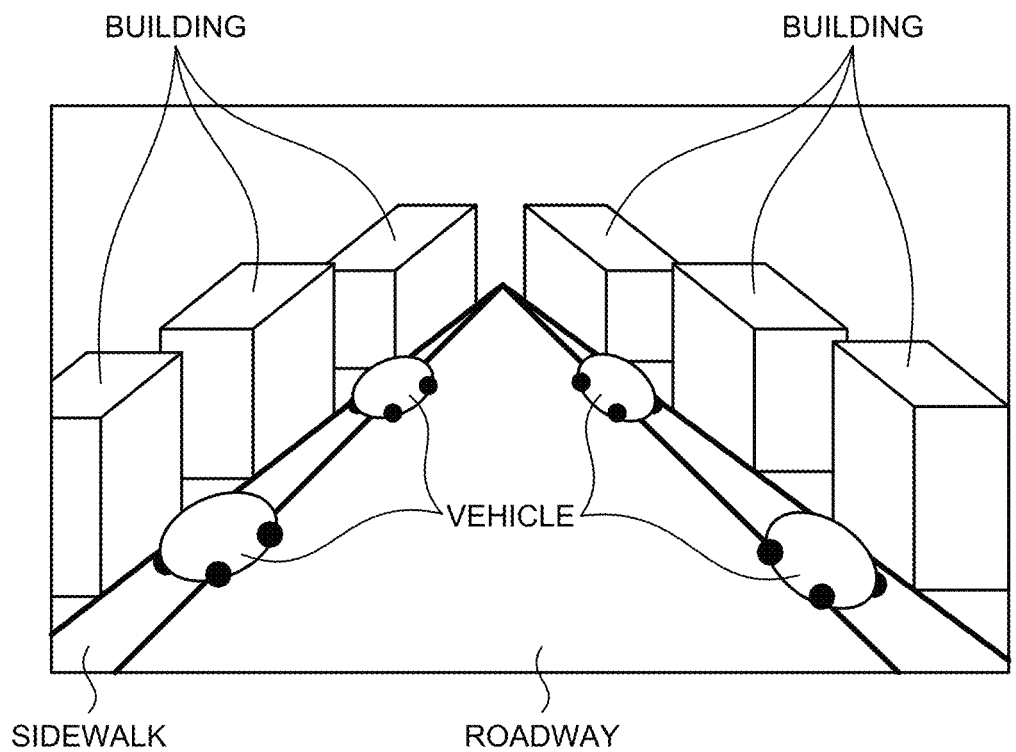
FIG. 13 is a diagram illustrating an example of a taken image of the second embodiment.

The imaging unit is mounted on the subject vehicle and images the surroundings of the subject vehicle. FIG. 13 is a diagram illustrating an example of the taken image obtained by the imaging unit. FIG. 13 is a taken image obtained by imaging the front of the vehicle, and this taken image contains a roadway, a sidewalk on the side of the roadway, parked vehicles, and buildings. The imaging unit images a range related to the travel of the subject vehicle and sends a taken image as illustrated in FIG. 13 obtained by the imaging to the attribute determining function 100e.

The attribute determining function 100e determines (identifies) an attribute on a pixel level for the objects contained in the image. This attribute determination (attribute identification) can be achieved by using mechanical learning. Many methods are generally known about image attribute identification using the mechanical learning, and the attribute can be determined (identified) on the pixel level using methods such as J. Long, et al., "Fully Convolutional Networks for Semantic Segmentation", CVPR2015 and V. Badrinarayanan, et al., "SegNet: A Deep Convolutional Encoder-Decoder Architecture for Robust Semantic Pixel-Wise Labelling", CVPR2015. Refer to the literature for the details of the methods.

Figure 14:
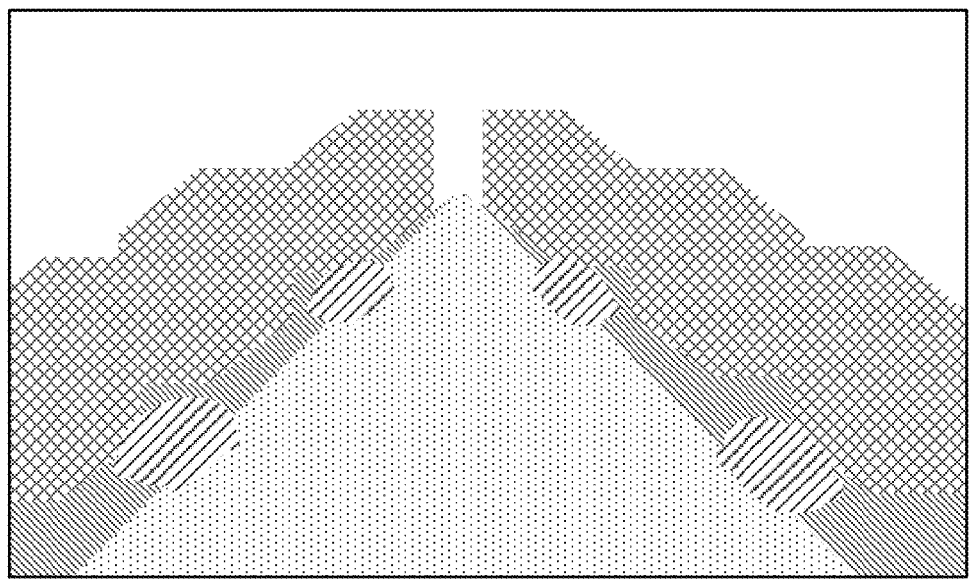
FIG. 14 is a diagram illustrating an example of attribute information of the second embodiment.

The attribute determining function 100e determines the attribute for each of a plurality of pixels contained in the taken image in FIG. 13 and generates attribute information indicating the determination result. More specifically, the attribute determining function 100e, for each of the pixels contained in the taken image in FIG. 13, determines the attribute of the pixel. The pixel value of each of the pixels is set for a value representing the determined attribute to generate the attribute information as illustrated in FIG. 14. The attribute determining function 100e sends the generated attribute information to the second calculating function 100f.

The second calculating function 100f calculates the probability that the object is present based on the attribute determined by the attribute determining function 100e for each of the areas obtained by dividing the surroundings of the subject vehicle. The following description may refer to the probability calculated by the second calculating function 100f as a "second obstacle presence probability". In this example, the second calculating function 100f, based on positional relation information indicating a positional relation between the imaging unit and a road surface, projects the attribute information generated by the attribute determining function 100e onto the road surface, transforms the image projected onto the road surface into a top-face image indicating an image viewed from above the road surface, and calculates the probability that the object is present (the second obstacle presence probability) for each area of the top-face image corresponding to each of the areas obtained by dividing the surroundings of the subject vehicle.

Figure 15:
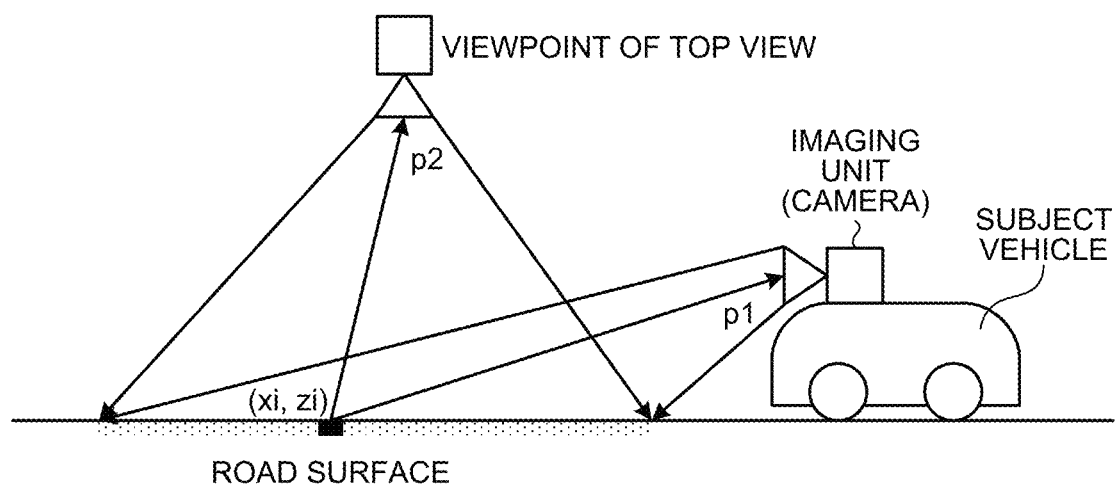
FIG. 15 is a diagram illustrating a method of transformation into a top-face image of the second embodiment.

The transformation from the image projected onto the road surface into the top-face image can be achieved by using a method that is generally called inverse perspective mapping and is widely known. The following outlines inverse perspective mapping with reference to FIG. 15. Similarly to the first embodiment, the traveling direction is the z axis, the height direction is the y axis, and the direction orthogonal to the z axis and the y axis is the x axis. First, coordinates of an area contained in a range for which the obstacle presence probability is to be recognized are set to (xi,zi). The position and the attitude of the imaging unit relative to the road surface are known, and perspective projection transformation using the positional relation information between the imaging unit and the road surface can determine a pixel p1 of the taken image corresponding to the coordinates (xi,zi) of the area. Similarly, performing perspective projection transformation using positional relation information between a position designated as a viewpoint of the top-face image (a top view) and the road surface can determine a pixel p2 of the top-face image corresponding to the coordinates (xi,zi) of the area. By assigning the pixel value of the pixel p1 of the attribute information as the pixel value of the pixel p2 of the top-face image, the pixel values of the respective pixels of the top-face image can be set.

Figure 16A:
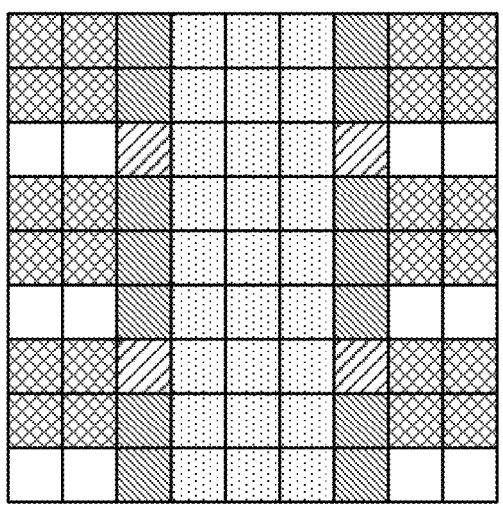
FIGS. 16A and 16B are diagrams illustrating the calculation of a second obstacle presence probability of the second embodiment.
Figure 16B:
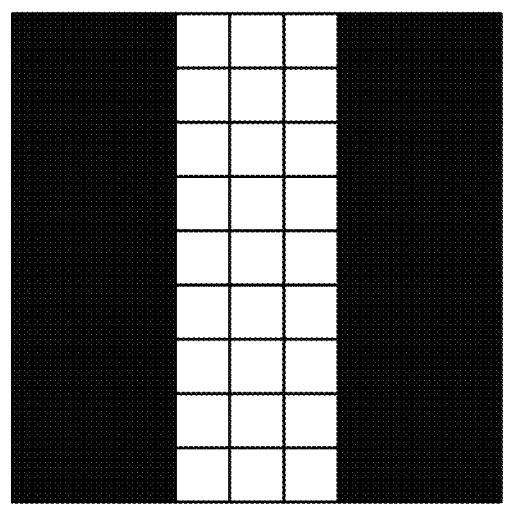

FIG. 16A is a diagram illustrating an image obtained by transforming the attribute information in FIG. 14 into the top-face image. The attribute information generated from the taken image is transformed into the image (the top-face image) corresponding to a viewpoint when viewing down the road surface from above. The rectangular areas in FIGS. 16A and 16B are areas indicating the same positions and ranges of the areas obtained by dividing the space around the subject vehicle into the rectangles described in the first embodiment. Furthermore, the second calculating function 100*f*, for each of the areas contained in the top-face image, based on the attribute of the area, calculates the probability that the object is present in the area (the second obstacle presence probability). In the present embodiment, as illustrated in FIG. 16B, there is no object (obstacle) only in the areas the attribute of which has been identified (determined) to be a roadway, and the subject vehicle can travel, whereby the second obstacle presence probability is set to be the minimum value (0.0), whereas for the areas the attribute of which has been identified to be other than the roadway, the subject vehicle cannot travel, whereby the second obstacle presence probability is set to be the maximum value (1.0). As to the transformation from the attribute information into the second obstacle presence probability, the value of the second obstacle presence probability may be set in a multistage manner in accordance with an identification result, not being a choice between the minimum value (0.0) and the maximum value (1.0). In short, the second calculating function 100*f* may have a form that sets the second obstacle presence probability of the areas the attribute of which is the roadway to be a smaller value than the second obstacle presence probability of the areas the attribute of which is other than the roadway. As described above, the second calculating function 100*f* calculates the second obstacle presence probability based on the attribute determined by the attribute determining function 100*e* for each of the areas obtained by dividing the surroundings of the subject vehicle and sends a calculation result to the determining function 100*d*.

The determining function 100*d* determines the final probability that the object is present based on the obstacle presence probability calculated by the calculating function 100*b*, the second obstacle presence probability calculated by the second calculating function 100*f*, and the non-measurement information for each of the areas obtained by dividing the surroundings of the subject vehicle. As described above, in the present embodiment, the acquiring function 100*a* acquires the positional information measured by one kind of sensor, whereas the non-measurement information recording function 100*c* records the non-measurement information corresponding to the one kind of sensor, and the obstacle presence probability corresponding to the one kind of sensor (the obstacle presence probability of each of the areas calculated by the calculating function 100*b*) and the non-measurement information are sent to the determining function 100*d*.

As to a method for determining the final probability, the determining function 100*d* can determine (selectively determine) the second obstacle presence probability calculated by the second calculating function 100*f* to be the final probability when the non-measurement information is a threshold Nth or more, for example. The determining function 100*d* can also perform weighted summation corresponding to the non-measurement information of the obstacle presence probability calculated by the calculating function 100*b* and the second obstacle presence probability calculated by the second calculating function 100*f* to determine the final probability, for example. In this case, the weight can be set such that the weight of the second obstacle presence probability calculated by the second calculating function 100*f* will be increased and the weight of the obstacle presence probability calculated by the calculating function 100*b* will be reduced when the number of times of non-measurement is larger (when the number of times when the positional information was not obtained is larger). The determining function 100*d* can also reduce the weight of the second obstacle presence probability calculated by the second calculating function 100*f* for an area farther from the subject vehicle among the areas. This is because the area farther from the subject vehicle gives a larger positional error in the transformation from the attribute information into the top-face image. As described above, the determining function 100*d* can determine the final probability of each of the areas.

As described above, in the present embodiment, the obstacle presence probability of each of the areas obtained by dividing the surroundings of the subject vehicle is calculated based on the positional information measured by the sensor installed in the vehicle and the non-measurement information for the area corresponding to the direction in which the positional information was not obtained is recorded every time the positional information of the sensor was not obtained. Based on the taken image obtained by the imaging unit that images the surroundings of the vehicle, the attribute of each of the areas obtained by dividing the surroundings of the subject vehicle is determined, and the second obstacle presence probability is calculated based on the determined attribute for each of the areas. The final probability of the probability that the object is present is determined based on the obstacle presence probability, the second obstacle presence probability, and the non-measurement information for each of the areas, and the reliability of the final probability can be sufficiently increased compared with a configuration that calculates the final probability using one sensor 70 alone.

Third Embodiment

The following describes a third embodiment. For the parts common to those of the first embodiment, descriptions thereof will be omitted as appropriate.

Figure 17:
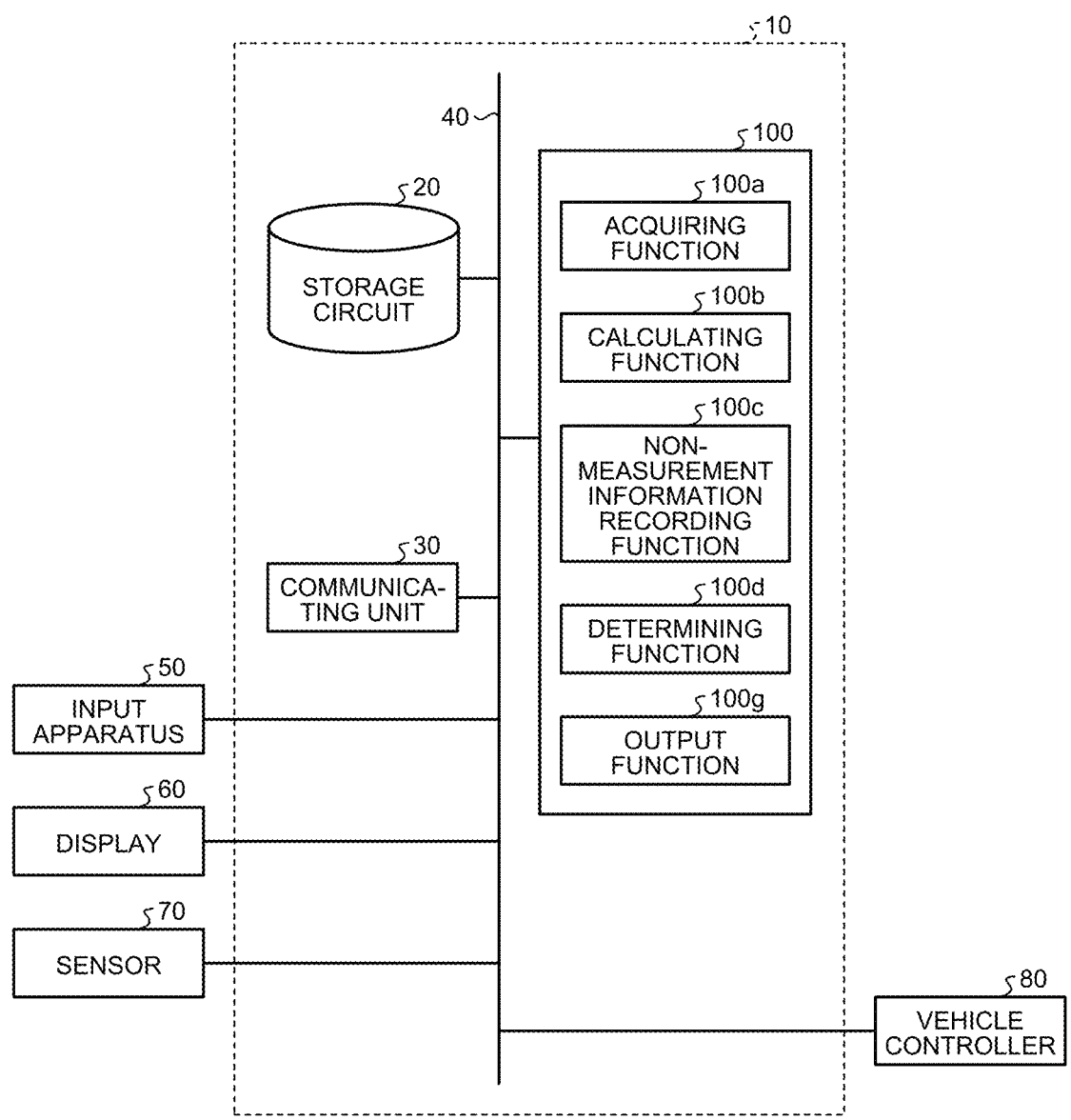
FIG. 17 is a diagram illustrating a configuration of an information processing apparatus of a third embodiment.

FIG. 17 is a diagram illustrating an example of a configuration of the information processing apparatus 10 of the present embodiment. As illustrated in FIG. 17, the processing circuit 100 is different from the first embodiment in that it further includes an output function 100*g*. The output function 100*g* outputs information that can identify the contribution degree of the sensor 70 that has measured the positional information used for the calculation of the final probability.

The determining function 100d calculates the final probability of the obstacle presence probability based on the obstacle presence probability calculated for each of the sensors 70 having different characteristics and the non-measurement information recorded for each of the sensors similarly to the first embodiment and sends the final probability to the output function 100g. In this process, when selecting any one of the obstacle presence probabilities calculated for each of the sensors 70 to determine the final probability as in FIG. 10A and FIG. 10B, the determining function 100d sends information indicating the obstacle presence probability corresponding to which sensor 70 has been selected (information indicating the contribution degree of the sensor 70) to the output function 100g in addition to the final probability. When the obstacle presence probabilities calculated for each of the sensors 70 are combined with weighting to calculate the final probability as in FIG. 10C, information indicating the weights for the respective sensors 70 (information indicating the contribution degree of the sensor 70) is sent to the output function 100g in addition to the final probability.

Figure 18A:
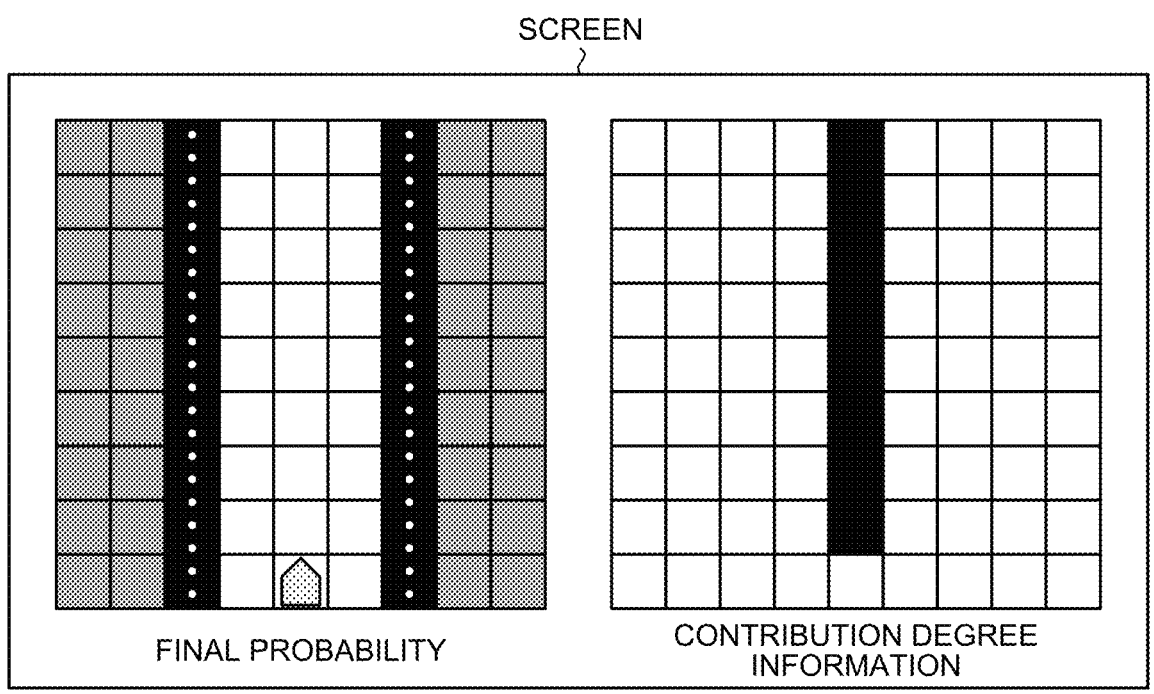
FIGS. 18A and 18B are diagrams illustrating a display example of contribution degree information of the third embodiment.

The present embodiment describes a case in which the output function 100g displays (an example of outputting) information that can identify the contribution degree of the sensor 70 (may be referred to as "contribution degree information" in the following description) as an image on the display 60 as an example. FIG. 18A is an information presentation example when any one of the obstacle presence probabilities calculated for each of the sensors 70 is selected to determine the final probability as in FIG. 10A and FIG. 10B. On the left side of the screen illustrated in FIG. 18A, the final probability of each of the areas determined by the determining function 100d is illustrated. On the right side of the screen, the contribution degree of each of the areas is illustrated. In this example, for each of a plurality of areas, the pixel value of the area is set to a value representing which sensor 70 has been selected among the sensors 70 (the obstacle presence probability corresponding to which sensor 70 has been selected). FIG. 18A is an example of a case of two kinds of sensors 70, in which the pixel value of each of the areas is set to a value corresponding to the gradation of "white" when one sensor 70 is selected and is set to a value corresponding to the gradation of "black" when the other sensor 70 is selected. The pixel value (the contribution degree information) of each of the areas is not limited to monochrome and may be displayed in color, for example. Displaying in color can enable easy determination on which sensor 70 has been selected for each of the areas even when three or more kinds of sensors 70 are used, for example.

Figure 18B:
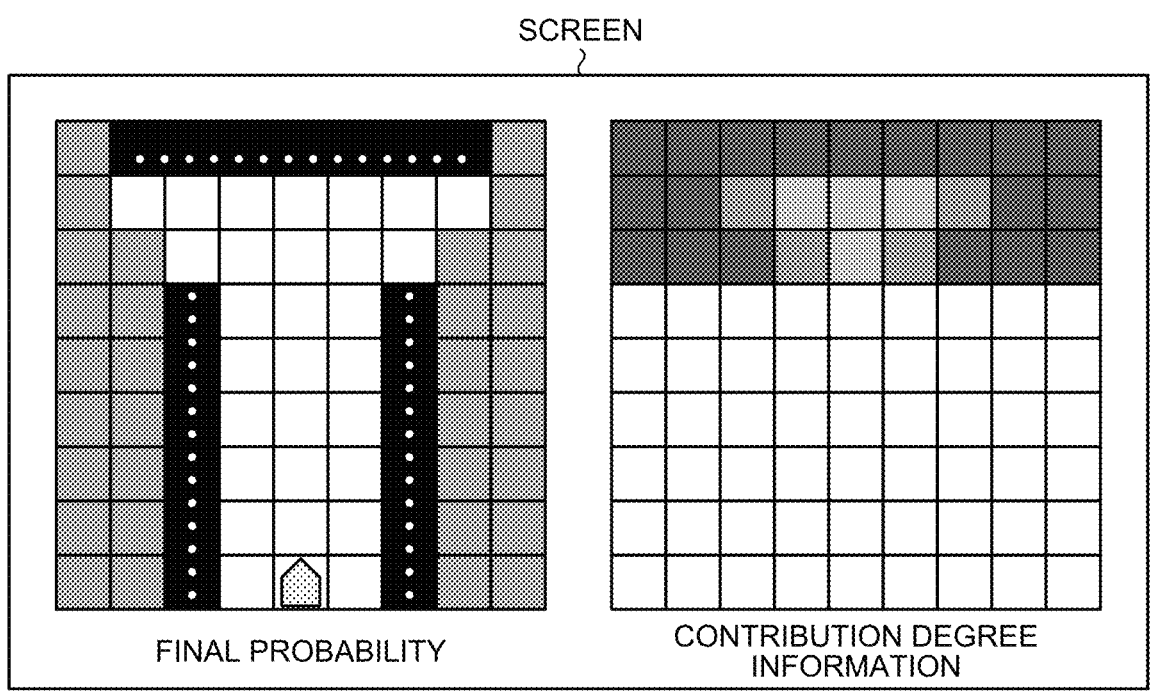

FIG. 18B is an information presentation example when the obstacle presence probabilities calculated for each of the sensors 70 are combined with weighting to calculate the final probability as in FIG. 10C. On the left side of the screen illustrated in FIG. 18B, the final probability of each of the areas determined by the determining function 100d is illustrated. On the right side of the screen, the contribution degree of each of the areas is illustrated. In this example, for each of a plurality of areas, the pixel value of the area is set to a value corresponding to the weight of each of the sensors 70 (the weight of the obstacle presence probability corresponding to each of the sensors 70). FIG. 18B is an example of a case of two kinds of sensors 70 and means that when the gradation of each of the areas is nearer to "white", the weight of one sensor 70 is strong, whereas when the gradation is nearer to "black", the weight of the other sensor 70 is strong. Similarly to FIG. 18A, the weight may be displayed in color. The present embodiment can also be applied to the second embodiment, and the output function 100g can display the contribution degree information that can identify the contribution degree of the sensor 70 and the imaging unit as an image on the display 60. In this case, similarly to the above, for each of the areas, the pixel value of the area may be set to a value representing which of the sensor 70 and the imaging unit has been selected or set to a value corresponding to the weight of each of the sensor 70 and the imaging unit.

Computer programs to be executed by the information processing apparatus 10 of the embodiments and modifications may be stored in a computer connected to a network such as the Internet and provided by being downloaded via the network. The computer programs to be executed by the information processing apparatus 10 of the embodiments and modifications may be provided or distributed via a network such as the Internet. The computer programs to be executed by the information processing apparatus 10 of the embodiments and modifications may be embedded and provided in a nonvolatile recording medium such as a ROM.

Furthermore, the embodiments and modifications can also be freely combined.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing apparatus comprising:
a memory having computer executable components stored therein; and
processing circuitry communicatively coupled to the memory, the processing circuitry configured to:
acquire, for each of a plurality of sensors having different characteristics and installed in a vehicle, time-series positional information of an object present around the vehicle measured by the plurality of sensors;
calculate, for each of the plurality of sensors, time-series probabilities each being a probability that the object is present for each of a plurality of areas obtained by dividing surroundings of the vehicle, the time-series probabilities being calculated based on the time-series positional information measured by the corresponding sensor;
calculate, for each of the plurality of sensors, an integrated probability by integrating the time-series probabilities calculated for the corresponding sensor;
record, for each of the plurality of sensors, non-measurement information for an area corresponding to a direction in which the time-series positional information was not obtained, the non-measurement information representing a number of times that the time-series positional information was not obtained at the area by each of the sensors or representing a time when the time-series positional information was not obtained at the area by each of the sensors; and
determine a final probability for each of the plurality of areas based on the integrated probability calculated for each of the sensors and the non-measurement information recorded for each of the sensors, wherein the final probability is determined by performing weighted summation of the integrated probabilities calculated for the sensors with weights corresponding to the non-measurement information.

2. The information processing apparatus according to claim 1, wherein the determining increases the weight of the integrated probability calculated based on the time-series positional information measured by the sensor the number of times of which that the time-series positional information was not obtained is less to determine the final probability.

3. The information processing apparatus according to claim 1, wherein the processing circuitry is further configured to output information that is capable of identifying a contribution degree of a sensor that has measured the time-series positional information used for calculation of the final probability.

4. An information processing apparatus comprising:
a memory having computer executable components stored therein; and
processing circuitry communicatively coupled to the memory, the processing circuitry configured to:
   acquire time-series positional information, which is measured by a sensor installed in a vehicle, of an object present around the vehicle;
   perform a first calculation that calculates time-series probabilities each being a probability that the object is present for each of a plurality of areas obtained by dividing surroundings of the vehicle, the time-series probabilities being calculated based on the time-series positional information;
   calculate an integrated probability by integrating the time-series probabilities calculated at the first calculation;
   record non-measurement information indicating that the time-series positional information was not obtained for an area corresponding to a direction in which the time-series positional information was not obtained, the non-measurement information representing a number of times that the time-series positional information was not obtained at the area or representing a time when the time-series positional information was not obtained at the area;
   determine an attribute of each of the plurality of areas based on a taken image obtained by a camera that images the surroundings of the vehicle, the attribute representing either a roadway or others;
   perform a second calculation that calculates a probability that the object is present based on the attribute for each of the plurality of areas; and
   determine a final probability for each of the plurality of areas based on the integrated probability, the probability calculated at the second calculation, and the non-measurement information,
wherein the final probability is determined by performing weighted summation of the integrated probability and the probability calculated at the second calculation with weights corresponding to the non-measurement information.

5. An information processing method comprising:
acquiring, for each of a plurality of sensors having different characteristics and installed in a vehicle, time-series positional information of an object present around the vehicle measured by the plurality of sensors;
calculating, for each of the plurality of sensors, time-series probabilities each being a probability that the object is present for each of a plurality of areas obtained by dividing surroundings of the vehicle, the time-series probabilities being calculated based on the time-series positional information measured by the corresponding sensor;
calculating, for each of the plurality of sensors, an integrated probability by integrating the time-series probabilities calculated for the corresponding sensor;
recording, for each of the plurality of sensors, non-measurement information for an area corresponding to a direction in which the time-series positional information was not obtained, the non-measurement information representing a number of times that the time-series positional information was not obtained at the area by each of the sensors or representing a time when the time-series positional information was not obtained at the area by each of the sensors; and
determining a final probability for each of the plurality of areas based on the integrated probability calculated for each of the sensors and the non-measurement information recorded for each of the sensors,
wherein the final probability is determined by performing weighted summation of the integrated probabilities calculated for the sensors with weights corresponding to the non-measurement information.

6. The method according to claim 5, wherein the determining includes increasing the weight of the integrated probability calculated based on the time-series positional information measured by the sensor the number of times of which that the time-series positional information was not obtained is less to determine the final probability.

7. The method according to claim 5, further comprising outputting information that is capable of identifying a contribution degree of a sensor that has measured the time-series positional information used for calculation of the final probability.

* * * * *